United States Patent
Jacob et al.

(10) Patent No.: US 11,508,061 B2
(45) Date of Patent: Nov. 22, 2022

(54) MEDICAL IMAGE SEGMENTATION WITH UNCERTAINTY ESTIMATION

(71) Applicant: Siemens Healthcare GmbH, Erlangen (DE)

(72) Inventors: Athira Jacob, Plainsboro, NJ (US); Mehmet Gulsun, Lawrenceville, NJ (US); Puneet Sharma, Princeton Junction, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 106 days.

(21) Appl. No.: 16/796,156

(22) Filed: Feb. 20, 2020

(65) Prior Publication Data

US 2021/0264589 A1 Aug. 26, 2021

(51) Int. Cl.
| | |
|---|---|
| *G06T 7/00* | (2017.01) |
| *G06T 7/11* | (2017.01) |
| *G06T 7/143* | (2017.01) |
| *G06N 3/04* | (2006.01) |
| *G06T 7/194* | (2017.01) |

(52) U.S. Cl.
CPC ......... *G06T 7/0012* (2013.01); *G06N 3/0454* (2013.01); *G06T 7/11* (2017.01); *G06T 7/143* (2017.01); *G06T 7/194* (2017.01); *G06T 2207/20081* (2013.01); *G06T 2207/20084* (2013.01); *G06T 2207/30004* (2013.01)

(58) Field of Classification Search
CPC ......... G06T 7/0012; G06T 7/11; G06T 7/143; G06T 7/194; G06T 2207/20081; G06T 2207/20084; G06T 2207/30004
See application file for complete search history.

(56) References Cited

U.S. PATENT DOCUMENTS

| | | | |
|---|---|---|---|
| 7,680,312 B2 | 3/2010 | Jolly et al. | |
| 2006/0188013 A1* | 8/2006 | Coimbra | H04N 19/51 |
| | | | 375/E7.123 |

(Continued)

FOREIGN PATENT DOCUMENTS

WO WO-2018222755 A1 * 12/2018 ........... G06N 3/0454

OTHER PUBLICATIONS

Yang et al. "Suggestive annotation: A deep active learning framework for biomedical image segmentation." International conference on medical image computing and computer-assisted intervention. Springer, Cham, 2017. (Year: 2017).*

(Continued)

*Primary Examiner* — Katrina R Fujita (57) ABSTRACT

Systems and methods for generating a segmentation mask of an anatomical structure, along with a measure of uncertainty of the segmentation mask, are provided. In accordance with one or more embodiments, a plurality of candidate segmentation masks of an anatomical structure is generated from an input medical image using one or more trained machine learning networks. A final segmentation mask of the anatomical structure is determined based on the plurality of candidate segmentation masks. A measure of uncertainty associated with the final segmentation mask is determined based on the plurality of candidate segmentation masks. The final segmentation mask and/or the measure of uncertainty are output.

16 Claims, 5 Drawing Sheets

(56) References Cited

U.S. PATENT DOCUMENTS

| | | | | |
|---|---|---|---|---|
| 2012/0070052 | A1* | 3/2012 | Maroy | G06T 7/149 382/131 |
| 2012/0250933 | A1* | 10/2012 | Porikli | G06K 9/6224 382/100 |
| 2018/0144209 | A1* | 5/2018 | Kim | G06N 3/08 |
| 2019/0206054 | A1* | 7/2019 | Mao | G06T 11/008 |
| 2020/0082221 | A1* | 3/2020 | Tsai | G06K 9/6262 |
| 2020/0085382 | A1* | 3/2020 | Taerum | G06T 7/30 |
| 2020/0160122 | A1* | 5/2020 | Lints | G06Q 10/06315 |
| 2020/0273176 | A1* | 8/2020 | Takeda | G06T 7/194 |
| 2020/0342589 | A1* | 10/2020 | Heindl | G06T 7/136 |
| 2020/0364852 | A1* | 11/2020 | Park | G06T 7/174 |
| 2021/0012493 | A1* | 1/2021 | Jiang | A61B 5/0022 |
| 2021/0241034 | A1* | 8/2021 | Laradji | G06V 10/764 |
| 2022/0051801 | A1* | 2/2022 | Feng | G06N 3/02 |

OTHER PUBLICATIONS

Lucas, Alice, et al. "Self-supervised fine-tuning for correcting super-resolution convolutional neural networks." arXiv preprint arXiv: 1912.12879 (Dec. 2019). (Year: 2019).*

Cai et al. "Iterative attention mining for weakly supervised thoracic disease pattern localization in chest x-rays." International Conference on Medical Image Computing and Computer-Assisted Intervention. Springer, Cham, 2018. (Year: 2018).*

Huang et al. "Class activation map generation by multiple level class grouping and orthogonal constraint." 2019 Digital Image Computing: Techniques and Applications (DICTA). IEEE, 2019. (Year: 2019).*

Laradji et al. "Where are the masks: Instance segmentation with image-level supervision." arXiv preprint arXiv:1907.01430 (2019). (Year: 2019).*

Li et al. "Weakly supervised salient object detection using image labels." Proceedings of the AAAI conference on artificial intelligence. vol. 32. No. 1. 2018. (Year: 2018).*

Meng et al. "Class activation map generation by representative class selection and multi-layer feature fusion." arXiv preprint arXiv: 1901.07683 (2019). (Year: 2019).*

Kohl et al., "A Probabilistic U-Net for Segmentation of Ambiguous Images", 32nd Conference on Neural Information Processing Systems (NeurIPS), Montreal, Canada, 2018, pp. 1-28.

* cited by examiner

MEDICAL IMAGE SEGMENTATION WITH UNCERTAINTY ESTIMATION

TECHNICAL FIELD

The present invention relates generally to medical image segmentation with uncertainty estimation, and more particularly to medical image segmentation with uncertainty estimation for automatically performing a clinical workflow.

BACKGROUND

Medical imaging analysis is increasingly being applied in clinical workflows. For example, medical imaging analysis may be applied for diagnosing a patient with a disease or other medical conditions. Often times, such medical imaging analysis is performed by first segmenting anatomical structures from medical images before applying other medical imaging analysis tasks that use the segmented anatomical structures. Conventionally, the segmentation of anatomical structures from medical images is either performed manually by a user, performed using a computer based on initial points identified by a user, or performed using a computer and modified or verified by a user. Such conventional segmentation techniques require user input and therefore are not suitable for integrating into an automatically performed clinical workflow.

BRIEF SUMMARY OF THE INVENTION

Deep learning techniques for segmenting anatomical structures from medical images of a patient do not provide a measure of uncertainty associated with the segmentation results. It is difficult to integrate such deep learning segmentation techniques into an automatically performed clinical workflow without knowing the uncertainty associated with segmentation results. Advantageously, in accordance with one or more embodiments, systems and methods for generating a segmentation mask of an anatomical structure, along with a measure of uncertainty of the segmentation mask, are provided.

In accordance with one or more embodiments, a plurality of candidate segmentation masks of an anatomical structure is generated from an input medical image using one or more trained machine learning networks. A final segmentation mask of the anatomical structure is determined based on the plurality of candidate segmentation masks. A measure of uncertainty associated with the final segmentation mask is determined based on the plurality of candidate segmentation masks. The final segmentation mask and/or the measure of uncertainty are output.

In one embodiment, the plurality of candidate segmentation masks are generated by sampling a plurality of samples from a prior distribution and, for each respective sample of the plurality of samples, generating a candidate segmentation mask based on the respective sample. The prior distribution is a probability distribution of segmentation variations of the anatomical structure in the input medical image. In one embodiment, the one or more trained machine learning networks comprise a plurality of different trained machine learning networks and the plurality of candidate segmentation masks are generated by generating, for each respective trained machine learning network of the plurality of different trained machine learning networks, a candidate segmentation mask of the anatomical structure from the input medical image using the respective trained machine learning network.

In one embodiment, the final segmentation mask is determined as a mean of the plurality of candidate segmentation masks and the measure of uncertainty is determined as a variance of the plurality of candidate segmentation masks. In one embodiment, the measure of uncertainty is determined by determining a probability associated with each pixel that may represent a boundary of the final segmentation mask and averaging the probability associated with each pixel that may represent the boundary of the final segmentation mask.

In one embodiment, user input may be requested for the final segmentation mask based on the measure of uncertainty. In one embodiment, anomalies may be detected in the input medical image based on the measure of uncertainty. In one embodiment, the probability associated with each pixel that may represent the boundary of the segmentation mask is compared with a threshold, a color is assigned to each pixel that may represent the boundary of the segmentation mask based on the comparing, and the color for each pixel that may represent the boundary of the segmentation mask is overlaid on the input medical image.

These and other advantages of the invention will be apparent to those of ordinary skill in the art by reference to the following detailed description and the accompanying drawings.

DETAILED DESCRIPTION

The embodiments described herein generally relate to methods and systems for medical image segmentation with uncertainty estimation. The embodiments described herein are described to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
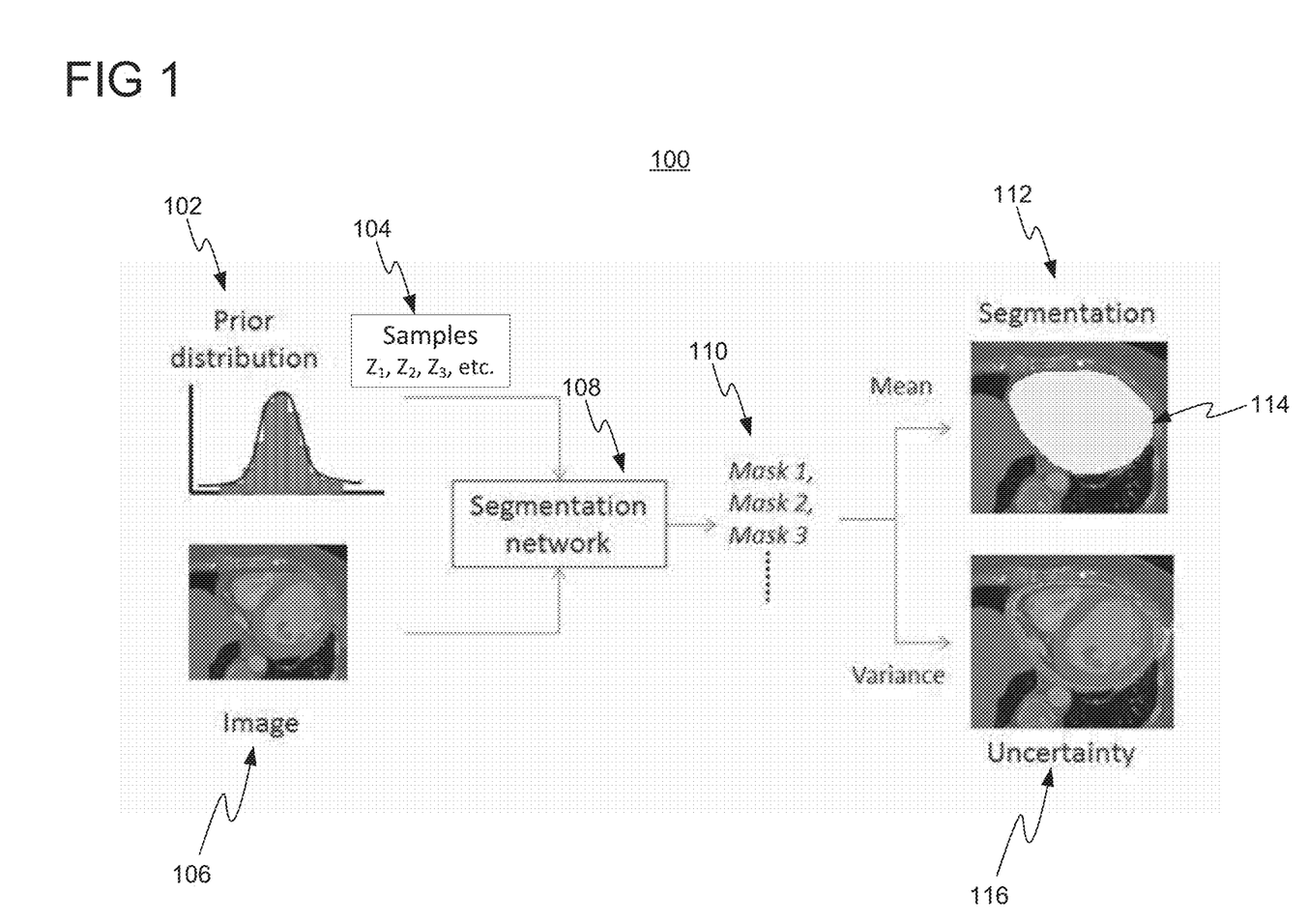
FIG. 1 shows a workflow for performing medical image segmentation with uncertainty estimation, in accordance with one or more embodiments.

Embodiments described herein provide for the segmentation of anatomical structures from medical images, along with a measure of uncertainty associated with the segmentation. FIG. 1 shows a workflow 100 for performing medical image segmentation with uncertainty estimation, in accordance with one or more embodiments. In workflow 100, a segmentation network 108 generates a plurality of candidate segmentation masks 110 of an anatomical structure based on 1) samples 104 sampled from a prior distribution 102 and 2) an image 106 of the anatomical structure. Prior distribution 102 is a probability distribution of segmentation variations of the anatomical structure in image 106. A final segmentation mask 114 is determined as the mean of the plurality of candidate segmentation masks 110. Final segmentation mask 114 is overlaid over image 106 to provide output image 112 of the segmented anatomical structure. A measure of uncertainty associated with the final segmentation mask 114 is also determined as the variance of the plurality of candidate segmentation masks 110. The measure of uncertainty may be determined as probabilities associated with pixels that may possibly represent the boundary of final segmentation mask 114. The measure of uncertainty may be represented by one or more colors (e.g., by comparing the probabilities with one or more thresholds) and overlaid on image 106 to provide output image 116 of the measure of uncertainty associated with the segmented anatomical structure. It should be understood that reference herein to pixels of an image may also refer to voxels of an image.

Advantageously, the measure of uncertainty associated with the final segmentation mask 114 allows the final segmentation mask 114 to be incorporated into a clinical workflow, e.g., for diagnosis of a disease, to automatically perform the clinical workflow. For example, the final segmentation mask 114 may be used to automatically perform a clinical workflow without user input where the measure of uncertainty indicates a low level of uncertainty (e.g., based on one or more thresholds), while user input (e.g., verification or modification of final segmentation mask 114) may be requested where the measure of uncertainty indicates a high level of uncertainty.

Figure 2:
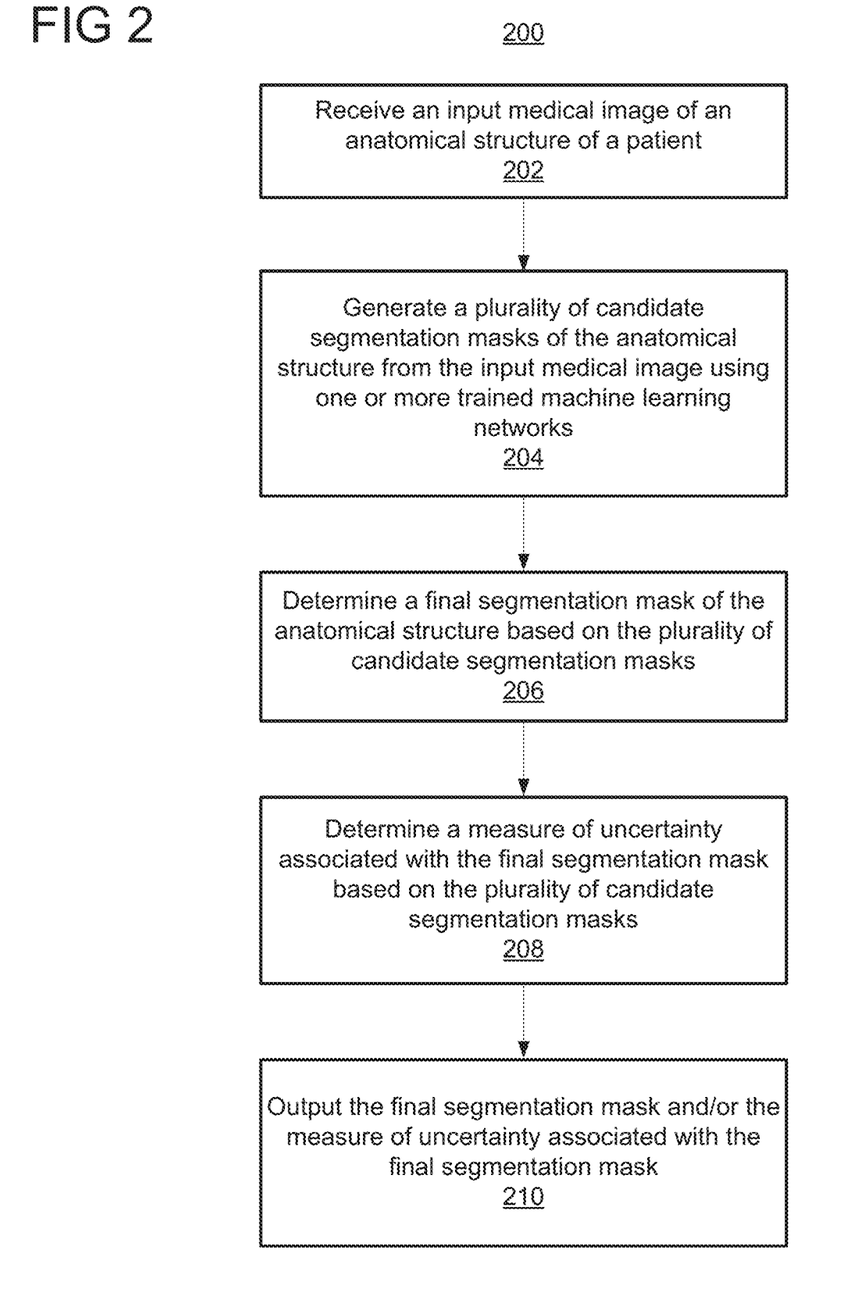
FIG. 2 shows a method for medical image segmentation with uncertainty estimation, in accordance with one or more embodiments.

FIG. 2 shows a method 200 for medical image segmentation with uncertainty estimation, in accordance with one or more embodiments. Method 200 will be described with continued reference to workflow 100 of FIG. 1. Method 200 may be performed by one or more suitable computing devices, such as computer 502 of FIG. 5.

At step 202, an input medical image of an anatomical structure of a patient is received. In one embodiment, the input medical image is image 106 of FIG. 1. The anatomical structure depicted in the input medical image may include one or more organs, bones, vessels, or any other anatomical objects of interest. The input medical image may be of any suitable modality, such as, e.g., x-ray, magnetic resonance imaging (MRI), ultrasound (US), computed tomography (CT), single-photon emission computed tomography (SPECT), positron emission tomography (PET), or any other suitable modality or combination of modalities. The input medical image may be of any suitable dimensionality, such as, e.g., two dimensional (2D) or three dimensional (3D). The input medical image may be received directly from an image acquisition device, such as, e.g., image acquisition device 514 of FIG. 5, used to acquire the input medical image. Alternatively, the input medical image may be received by loading medical images previously stored on a memory or storage of a computer system (e.g., a picture archiving and communication system, PACS) or by receiving the input medical image data via network transmission from a remote computer system.

At step 204, a plurality of candidate segmentation masks of the anatomical structure is generated from the input medical image using one or more trained machine learning-based segmentation networks. In one embodiment, as shown in workflow 100 of FIG. 1, the plurality of candidate segmentation masks is the plurality of candidate segmentation masks 110 generated from image 106 using segmentation network 108. The plurality of candidate segmentation masks of the anatomical structure are "candidates" in that the candidate segmentation masks are possible segmentation masks of the anatomical structure. The plurality of candidate segmentation masks may include any number of candidate segmentation masks greater than one. In one example, the plurality of candidate segmentation masks comprises 10 to 20 candidate segmentation masks, however the number of candidate segmentation masks may be adjusted to include less candidate segmentation masks (for faster processing time) or more candidate segmentation masks (for greater accuracy and reliability). In one embodiment, the one or more trained machine learning-based segmentation networks are deep learning based networks, such as, e.g., an image-to-image network with a variational autoencoder (VAE). However, it should be understood that the one or more trained machine learning-based segmentation networks may include any suitable machine learning networks.

In one embodiment, the plurality of candidate segmentation masks of the anatomical structure is generated using one or more trained machine learning-based segmentation networks based on a plurality of samples sampled from a prior distribution. For example, as shown in workflow 100 of FIG. 1, plurality of candidate segmentation masks 110 are generated using segmentation network 108 based on samples 104 sampled from prior distribution 102. The prior distribution is a probability distribution (e.g., a Gaussian distribution) of segmentation variations of the anatomical structure in the input medical image. The prior distribution is generated using a separate machine learning-based prior network (e.g., a U-Net) that inputs the input medical image and outputs the prior distribution. To generate the plurality of candidate segmentation masks, the plurality of samples are sampled from the prior distribution. The one or more trained machine learning-based segmentation networks receive as input the input medical image and the plurality of samples and output a candidate segmentation mask for each sample of the plurality of samples. The training of the one or more machine learning-based segmentation networks and the machine-learning based prior network is described below with respect to FIG. 3.

In one embodiment, the one or more trained machine learning-based segmentation networks comprise a plurality of different machine learning networks each trained to segment the anatomical structure from the input medical image. Each of the plurality of trained machine learning networks receives as input the input medical image and outputs a candidate segmentation mask to thereby generate the plurality of candidate segmentation masks.

Figure 3:
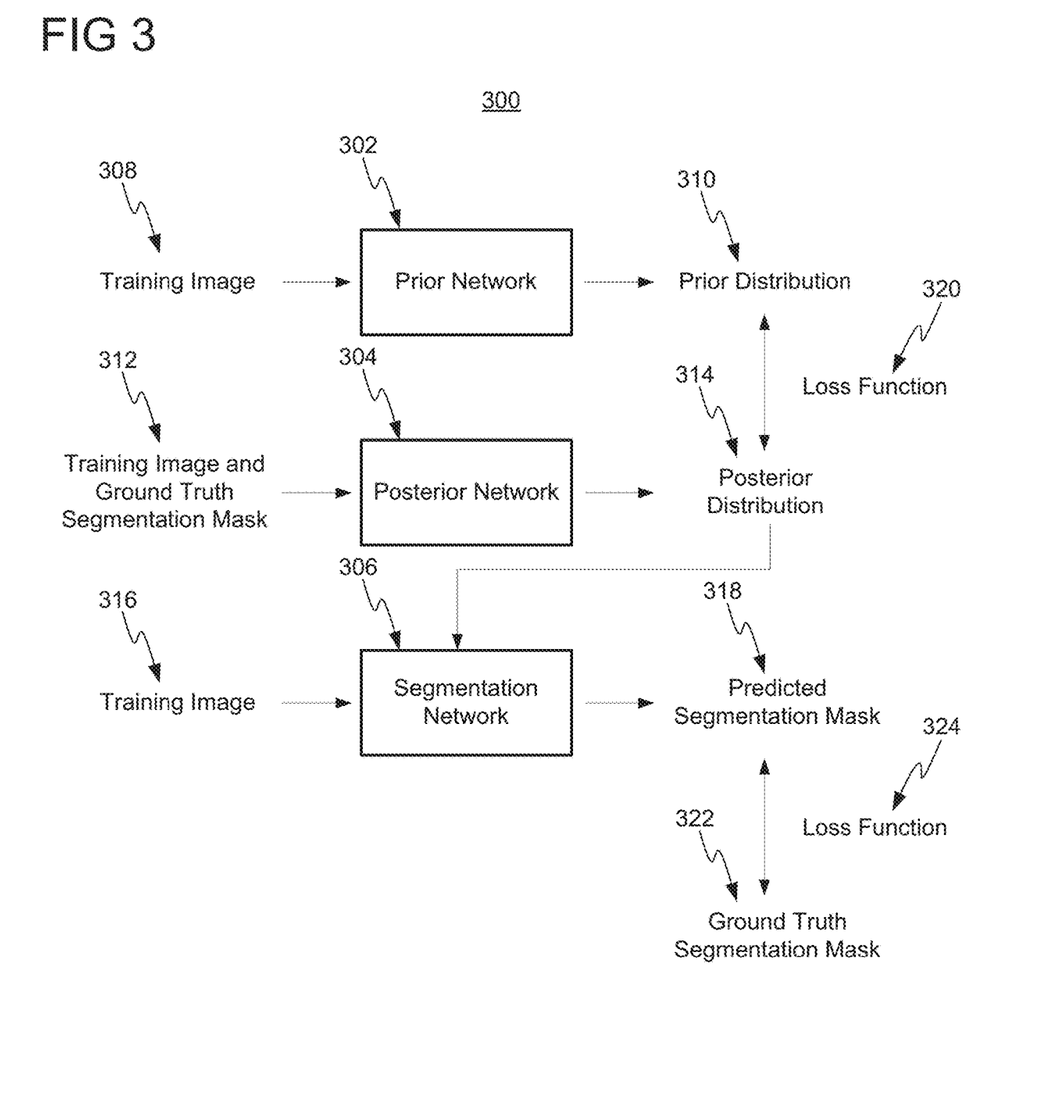
FIG. 3 shows a workflow for training a prior network and a segmentation network, in accordance with one or more embodiments.

FIG. 3 shows a workflow 300 for training a prior network 302 and a segmentation network 306, in accordance with one or more embodiments. In one embodiment, prior network 302 is the machine learning-based prior network used to generate the prior distribution in method 200 of FIG. 2 and segmentation network 306 is the one or more machine-learning based segmentation networks in method 200 of FIG. 2. Prior network 302 is learned along with segmentation network 306 using posterior network 304 as a 'teacher' network. Posterior network 304 is similar to prior network 302, however posterior network 304 receives one or more training images and a ground truth segmentation masks 312 as input and outputs posterior distributions 314. Prior network 302 only receives one or more training images 308 as input and generates a prior distribution 310 as output. Prior network 302 is trained to generate prior distribution 310 to be the same distribution as posterior distribution 314 using loss function 320. Loss function 320 may be any suitable loss function for minimizing the difference between probabilistic distributions, such as, e.g., KL (Kullback-Leibler)

Divergence. Segmentation network 306 is trained simultaneously with posterior network 304, and prior network 302 learns to simulate posterior network 304 but using only the training image (as the ground truth is not available during the inference stage). Segmentation network 306 receives one or more training images 316 as input and outputs predicted segmentation masks 318 by sampling posterior distribution 314. Segmentation network 306 is trained to generate predicted segmentation mask 318 to be the same as ground truth segmentation mask 322 using a loss function 324. Loss function 324 may be any suitable loss function for minimizing the difference between segmentation masks. During the inference stage, the prior network takes the place of the posterior network.

At step 206, a final segmentation mask of the anatomical structure is determined based on the plurality of candidate segmentation masks. In one embodiment, the final segmentation mask of the anatomical structure is computed as the mean of the plurality of candidate segmentation masks. In other embodiments, the final segmentation mask of the anatomical structure is computed as a median or a model (or any other suitable measure) of the plurality of candidate segmentation masks. For example, as shown in workflow 100 of FIG. 1, final segmentation mask 114 is computed as the mean of plurality of segmentation masks 110.

Each candidate segmentation mask is obtained by thresholding the final output of the segmentation network. Before the thresholding, the candidate segmentation masks can be interpreted as pixel wise activations for each label. The mean of the activations is determined, pixel wise, across all candidate segmentation masks, and each pixel is assigned the label with the highest average activation in that pixel. In some embodiments, the median or mode (or any other suitable measure) of the activations may instead be determined, pixel wise, across all candidate segmentation masks.

The final segmentation mask may be represented as a matrix of size C×n×n, where C is the number of possible labels. Accordingly, in one example, for a 256×256 size image with the labels 'background' and 'heart' (or any other anatomical structure), the size of the matrix will be 2×256×256. For each pixel, there are two activation values: one for background and one for heart. The pixel is assigned the label with the higher value. For N candidate segmentation masks, a matrix of size N×2×256×256 is determined. Thus, where there are, e.g., 20 candidate segmentation masks, there are 20 values for the label heart for each pixel. The mean (or median or mode or any other suitable measure) is computed from the 20 values, resulting in the final activation for the label heart for the final segmentation mask. A similar process may be followed for any other label.

At step 208, a measure of uncertainty associated with the final segmentation mask of the anatomical structure is determined based on the plurality of candidate segmentation masks. In one embodiment, the measure of uncertainty associated with the final segmentation mask is computed as the variance of the plurality of candidate segmentation masks. For example, as shown in workflow 100 of FIG. 1, the measure of uncertainty associated with final segmentation mask 114 is computed as the variance of the plurality of candidate segmentation masks 110.

In one embodiment, similar to the calculation of the mean described above with respect to step 206, the variance of activations is calculated, pixel wise, across all candidate segmentation masks to result in one variance map for each label of the candidate segmentation masks. In the example described above with respect to step 206, where there are 20 candidate segmentation masks, the variance may be computed across the 20 values for the label heart for each pixel, resulting in a variance map of size 2×256×256 for each label.

In one embodiment, the measure of uncertainty is determined as a probability associated with each pixel that may possibly represent the boundary of the final segmentation mask. In another embodiment, the measure of uncertainty is determined as a quantification of the uncertainty associated with the final segmentation mask. For example, the uncertainty associated with the final segmentation mask may be quantified by averaging the probability associated with each pixel that may possibly represent the boundary of the final segmentation mask. It should be understood that the measure of uncertainty may be in any other suitable format.

At step 210, the final segmentation mask and/or the measure of uncertainty associated with the final segmentation mask is output. For example, the final segmentation mask and/or the measure of uncertainty associated with the final segmentation mask can be output by displaying the final segmentation mask and/or the measure of uncertainty associated with the final segmentation mask on a display device of a computer system (e.g., computer 502 of FIG. 5), storing the final segmentation mask and/or the measure of uncertainty associated with the final segmentation mask on a memory or storage of a computer system, or by transmitting the final segmentation mask and/or the measure of uncertainty associated with the final segmentation mask to a remote computer system. The final segmentation mask and/or the measure of uncertainty associated with the final segmentation mask may be output in any suitable format. In one embodiment, the final segmentation mask is output by displaying the final segmentation mask overlaid over the input medical image as depicted by output image 112 in FIG. 1 and the measure of uncertainty associated with the final segmentation mask is output by displaying the measure of uncertainty associated with the final segmentation mask overlaid over the input medical image as depicted by output image 116 in FIG. 1.

In one embodiment, the measure of uncertainty associated with the final segmentation mask is overlaid over the input medical image by comparing probability associated with each pixel that may possibly represent the boundary of the final segmentation mask with one or more thresholds, assigning a color to the pixels based on whether or not the probability associated with the pixels satisfy the one or more thresholds, and overlaying the assigned color of the pixels on the input medical image. For example, pixels associated with probabilities that satisfy a threshold may be considered to have low uncertainty and may be assigned the color green while pixels associated with probabilities that do not satisfy a threshold may be considered to have high uncertainty and may be assigned the color red, thus resulting in an uncertainty map providing visual estimate of uncertainty regarding the accuracy of the final segmentation mask.

In one embodiment, the measure of uncertainty associated with the final segmentation mask is overlaid over the input medical image by averaging probabilities for regions (e.g., a 3 pixel×3 pixel region) of pixels that may possibly represent the boundary of the final segmentation mask, comparing the averaged probabilities for the regions with one or more thresholds, assigning a color to pixels (e.g., all pixels in the region or the center pixel of the region) based on whether or not the averaged probabilities satisfy the one or more thresholds, and overlaying the color assigned to the pixels on the input medical image to provide for an uncertainty map.

In one embodiment, regions of the final segmentation mask with a high level of uncertainty (e.g., based on one or more thresholds) may be presented to a user to request user input (e.g., to verify or modify the boundary of the final segmentation mask) or to otherwise direct the attention of the user to such regions. In one embodiment, the degree that the boundary of the final segmentation mask in certain regions can be modified is based on the level of uncertainty associated with the final segmentation mask in such regions.

In one embodiment, the measure of uncertainty associated with the final segmentation mask is used to determine a measure of uncertainty associated with downstream medical imaging analysis tasks in a clinical workflow. For example, the ejection fraction of the heart may be determined using the final segmentation mask and the range of variation (or the confidence interval) associated with the ejection fraction can be determined based on the measure of uncertainty associated with the final segmentation mask.

Figure 4:
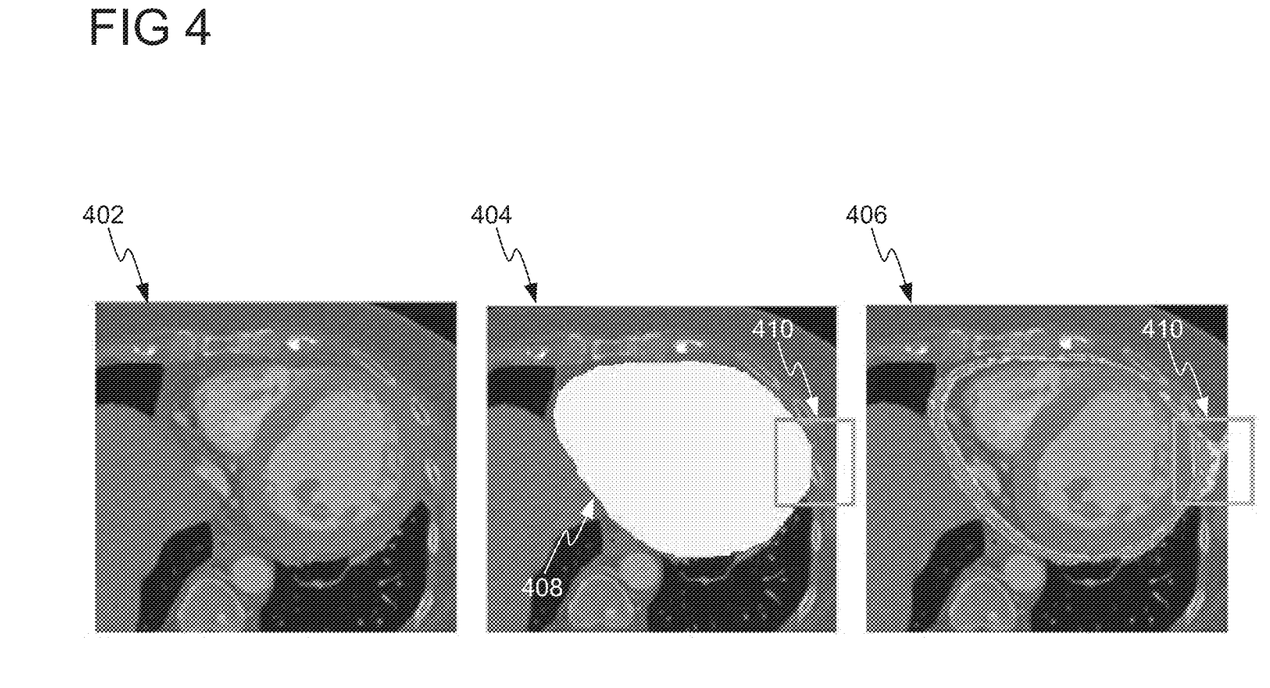
FIG. 4 shows images illustrating the detection of an anomaly based on a measure of uncertainty determined in accordance with one or more embodiments.

In one embodiment, the measure of uncertainty associated with the final segmentation mask may be used to detect anatomical anomalies in the input medical image or algorithm failure of the one or more trained machine learning networks. For example, FIG. 4 shows images illustrating the detection of an anatomical anomaly based on a measure of uncertainty. FIG. 4 shows an original input medical image 402 of a heart of a patient, an output image 404 of a final segmentation mask 408 overlaid on input medical image 402, and an output image 406 of a measure of uncertainty. Input medical image 402 depicts leakage of the pericardium mask to the ribs. Output image 404 and output image 406 are generated using one or more trained machine learning networks according to method 200 of FIG. 2. The leakage of the pericardium mask is detected in region 410 based on the high level of uncertainty in region 410, as depicted in output image 406.

In one embodiment, the measure of uncertainty associated with the final segmentation mask may be used to identify data that the one or more trained machine learning networks were not trained on. For example, a high level of uncertainty for an input medical image may indicate that the one or more trained machine learning networks were not trained on the scenario depicted in the input medical image. Accordingly, the measure of uncertainty provides a method to identify and selectively augment training data to obtain a complete representation of real life cases.

In one embodiment, the measure of uncertainty associated with the final segmentation mask may be used for robust segmentation or reconstruction of the anatomical structure. Given the measure of uncertainty, a prior shape model can be deformed to match regions of the final segmentation mask with a low level of uncertainty (a high level of confidence) while retaining its shape in regions of the final segmentation mask with a high level of uncertainty (a low level of confidence).

In one embodiment, the measure of uncertainty map be used to automatically create a plurality of proposed segmentation masks, which may be presented to a user for selection of the final segmentation mask. In this manner, user modification of the final segmentation mask is avoided.

In one embodiment, the measure of uncertainty associated with the final segmentation mask may be used to reject certain input medical images to thereby provide for a fully automatic clinical workflow with zero error. For example, the measure of uncertainty associated with a final segmentation mask of anatomical structures in input medical images may be compared with a threshold and input medical images may be rejected where the level of uncertainty associated with the final segmentation mask does not satisfy the threshold.

Systems, apparatuses, and methods described herein, including machine learning models, may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein, including machine learning models, may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein, including machine learning models, may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 1-3. Certain steps or functions of the methods and workflows described herein, including one or more of the steps or functions of FIGS. 1-3, may be performed by a server or by another processor in a network-based cloud-computing system. Certain steps or functions of the methods and workflows described herein, including one or more of the steps of FIGS. 1-3, may be performed by a client computer in a network-based cloud computing system. The steps or functions of the methods and workflows described herein, including one or more of the steps of FIGS. 1-3, may be performed by a server and/or by a client computer in a network-based cloud computing system, in any combination.

Systems, apparatus, and methods described herein, including machine learning models, may be implemented using a computer program product tangibly embodied in an information carrier, e.g., in a non-transitory machine-readable storage device, for execution by a programmable processor; and the method and workflow steps described herein, including one or more of the steps or functions of FIGS. 1-3, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 5:
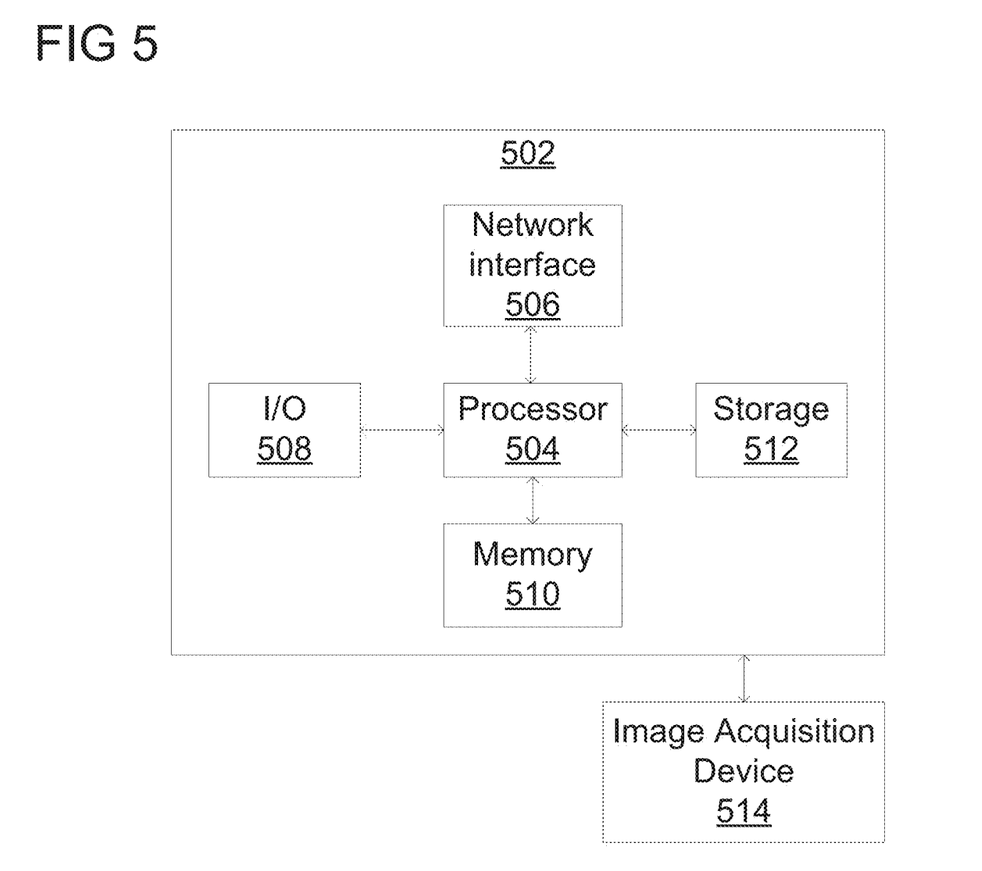
FIG. 5 shows a high-level block diagram of a computer.

A high-level block diagram of an example computer 502 that may be used to implement systems, apparatus, and methods described herein is depicted in FIG. 5. Computer 502 includes a processor 504 operatively coupled to a data storage device 512 and a memory 510. Processor 504 controls the overall operation of computer 502 by executing computer program instructions that define such operations. The computer program instructions may be stored in data storage device 512, or other computer readable medium, and loaded into memory 510 when execution of the computer program instructions is desired. Thus, the method and workflow steps or functions of FIGS. 1-3 can be defined by the computer program instructions stored in memory 510 and/or data storage device 512 and controlled by processor 504 executing the computer program instructions. For example, the computer program instructions can be implemented as computer executable code programmed by one skilled in the art to perform the method and workflow steps or functions of FIGS. 1-3. Accordingly, by executing the computer program instructions, the processor 504 executes the method and workflow steps or functions of FIGS. 1-3. Computer 502 may also include one or more network interfaces 506 for communicating with other devices via a network. Computer 502 may also include one or more input/output devices 508 that enable user interaction with computer 502 (e.g., display, keyboard, mouse, speakers, buttons, etc.).

Processor 504 may include both general and special purpose microprocessors, and may be the sole processor or one of multiple processors of computer 502. Processor 504 may include one or more central processing units (CPUs), for example. Processor 504, data storage device 512, and/or memory 510 may include, be supplemented by, or incorporated in, one or more application-specific integrated circuits (ASICs) and/or one or more field programmable gate arrays (FPGAs).

Data storage device 512 and memory 510 each include a tangible non-transitory computer readable storage medium. Data storage device 512, and memory 510, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 508 may include peripherals, such as a printer, scanner, display screen, etc. For example, input/output devices 508 may include a display device such as a cathode ray tube (CRT) or liquid crystal display (LCD) monitor for displaying information to the user, a keyboard, and a pointing device such as a mouse or a trackball by which the user can provide input to computer 502.

An image acquisition device 514 can be connected to the computer 502 to input image data (e.g., medical images) to the computer 502. It is possible to implement the image acquisition device 514 and the computer 502 as one device. It is also possible that the image acquisition device 514 and the computer 502 communicate wirelessly through a network. In a possible embodiment, the computer 502 can be located remotely with respect to the image acquisition device 514.

Any or all of the systems and apparatus discussed herein may be implemented using one or more computers such as computer 502.

One skilled in the art will recognize that an implementation of an actual computer or computer system may have other structures and may contain other components as well, and that FIG. 5 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
  generating a plurality of candidate segmentation masks of an anatomical structure from an input medical image using one or more trained machine learning networks;
  determining a final segmentation mask of the anatomical structure by calculating a mean of activation values of corresponding pixels across the plurality of candidate segmentation masks; and
  determining a measure of uncertainty associated with the final segmentation mask by calculating a variance of values of corresponding pixels across the plurality of candidate segmentation masks to generate a variance map.

2. The method of claim 1, wherein generating a plurality of candidate segmentation masks of an anatomical structure from an input medical image using one or more trained machine learning networks comprises:
  sampling a plurality of samples from a prior distribution, the prior distribution being a probability distribution of segmentation variations of the anatomical structure in the input medical image; and
  for each respective sample of the plurality of samples, generating a candidate segmentation mask based on the respective sample.

3. The method of claim 1, wherein the one or more trained machine learning networks comprise a plurality of different trained machine learning networks, and generating a plurality of candidate segmentation masks of an anatomical structure from an input medical image using one or more trained machine learning networks comprises:
  for each respective trained machine learning network of the plurality of different trained machine learning networks, generating a candidate segmentation mask of the anatomical structure from the input medical image using the respective trained machine learning network.

4. The method of claim 1, wherein determining a measure of uncertainty associated with the final segmentation mask by calculating a variance of values of corresponding pixels across the plurality of candidate segmentation masks to generate a variance map comprises:

determining a probability associated with each pixel that may represent a boundary of the final segmentation mask.

5. The method of claim 4, wherein determining a measure of uncertainty associated with the final segmentation mask by calculating a variance of values of corresponding pixels across the plurality of candidate segmentation masks to generate a variance map comprises:
averaging the probability associated with each pixel that may represent the boundary of the final segmentation mask.

6. The method of claim 4, further comprising:
comparing the probability associated with each pixel that may represent the boundary of the final segmentation mask with a threshold;
assigning a color to each pixel that may represent the boundary of the final segmentation mask based on the comparing; and
overlaying the color for each pixel that may represent the boundary of the final segmentation mask on the input medical image.

7. The method of claim 1, further comprising:
requesting user input for the final segmentation mask based on the measure of uncertainty.

8. The method of claim 1, further comprising:
detecting anomalies in the input medical image based on the measure of uncertainty.

9. The method of claim 1, further comprising:
identifying training data for further training the one or more trained machine learning networks based on the measure of uncertainty.

10. An apparatus, comprising:
means for generating a plurality of candidate segmentation masks of an anatomical structure from an input medical image using one or more trained machine learning networks;
means for determining a final segmentation mask of the anatomical structure by calculating a mean of activation values of corresponding pixels across the plurality of candidate segmentation masks; and
means for determining a measure of uncertainty associated with the final segmentation mask by calculating a variance of values of corresponding pixels across the plurality of candidate segmentation masks to generate a variance map.

11. The apparatus of claim 10, wherein the means for generating a plurality of candidate segmentation masks of an anatomical structure from an input medical image using one or more trained machine learning networks comprises:
means for sampling a plurality of samples from a prior distribution, the prior distribution being a probability distribution of segmentation variations of the anatomical structure in the input medical image; and
means for generating, for each respective sample of the plurality of samples, a candidate segmentation mask based on the respective sample.

12. The apparatus of claim 10, wherein the one or more trained machine learning networks comprise a plurality of different trained machine learning networks, and the means for generating a plurality of candidate segmentation masks of an anatomical structure from an input medical image using one or more trained machine learning networks comprises:
means for generating, for each respective trained machine learning network of the plurality of different trained machine learning networks, a candidate segmentation mask of the anatomical structure from the input medical image using the respective trained machine learning network.

13. A non-transitory computer readable medium storing computer program instructions, the computer program instructions when executed by a processor cause the processor to perform operations comprising:
generating a plurality of candidate segmentation masks of an anatomical structure from an input medical image using one or more trained machine learning networks;
determining a final segmentation mask of the anatomical structure by calculating a mean of activation values of corresponding pixels across the plurality of candidate segmentation masks; and
determining a measure of uncertainty associated with the final segmentation mask by calculating a variance of values of corresponding pixels across the plurality of candidate segmentation masks to generate a variance map.

14. The non-transitory computer readable medium of claim 13, wherein determining a measure of uncertainty associated with the final segmentation mask by calculating a variance of values of corresponding pixels across the plurality of candidate segmentation masks to generate a variance map comprises:
determining a probability associated with each pixel that may represent a boundary of the final segmentation mask.

15. The non-transitory computer readable medium of claim 14, wherein determining a measure of uncertainty associated with the final segmentation mask by calculating a variance of values of corresponding pixels across the plurality of candidate segmentation masks to generate a variance map comprises:
averaging the probability associated with each pixel that may represent the boundary of the final segmentation mask.

16. The non-transitory computer readable medium of claim 13, the operations further comprising:
requesting user input for the final segmentation mask based on the measure of uncertainty.

* * * * *